No. 816,198. PATENTED MAR. 27, 1906.
F. WESEL.
METAL CUTTING MACHINE.
APPLICATION FILED JAN. 14, 1905.

2 SHEETS—SHEET 1.

Witnesses:
N. C. Healy
T. F. Turpin

Inventor
F. Wesel
by James Shelby
atty

No. 816,198.  
PATENTED MAR. 27, 1906.  
F. WESEL.  
METAL CUTTING MACHINE.  
APPLICATION FILED JAN. 14, 1905.

2 SHEETS—SHEET 2.

Witnesses:  
N. C. Healy  
T. E. Turfter

Inventor  
F. Wesel.  
by James Shuely  
Atty

UNITED STATES PATENT OFFICE.

FERDINAND WESEL, OF BROOKLYN, NEW YORK.

METAL-CUTTING MACHINE.

No. 816,198.      Specification of Letters Patent.      Patented March 27, 1906.

Application filed January 14, 1905. Serial No. 241,139.

*To all whom it may concern:*

Be it known that I, FERDINAND WESEL, a citizen of the United States, residing at Brooklyn, in the county of Kings and State of New York, have invented new and useful Improvements in Metal-Cutting Machines, of which the following is a specification.

My invention pertains to metal-cutting machines, more particularly machines for trimming electrotypes and analogous plates; and it has for its object to provide a gage for such machines through the medium of which an electrotype or similar plate may be expeditiously and accurately positioned, so that its end will be cut or trimmed strictly parallel to its lines of type, and this notwithstanding the remoteness of the nearest line of type from the said end to be cut or trimmed.

Other objects and advantages of the invention will be fully understood from the following description and claims when taken in connection with the accompanying drawings, forming part of this specification, in which—

Figure 2:
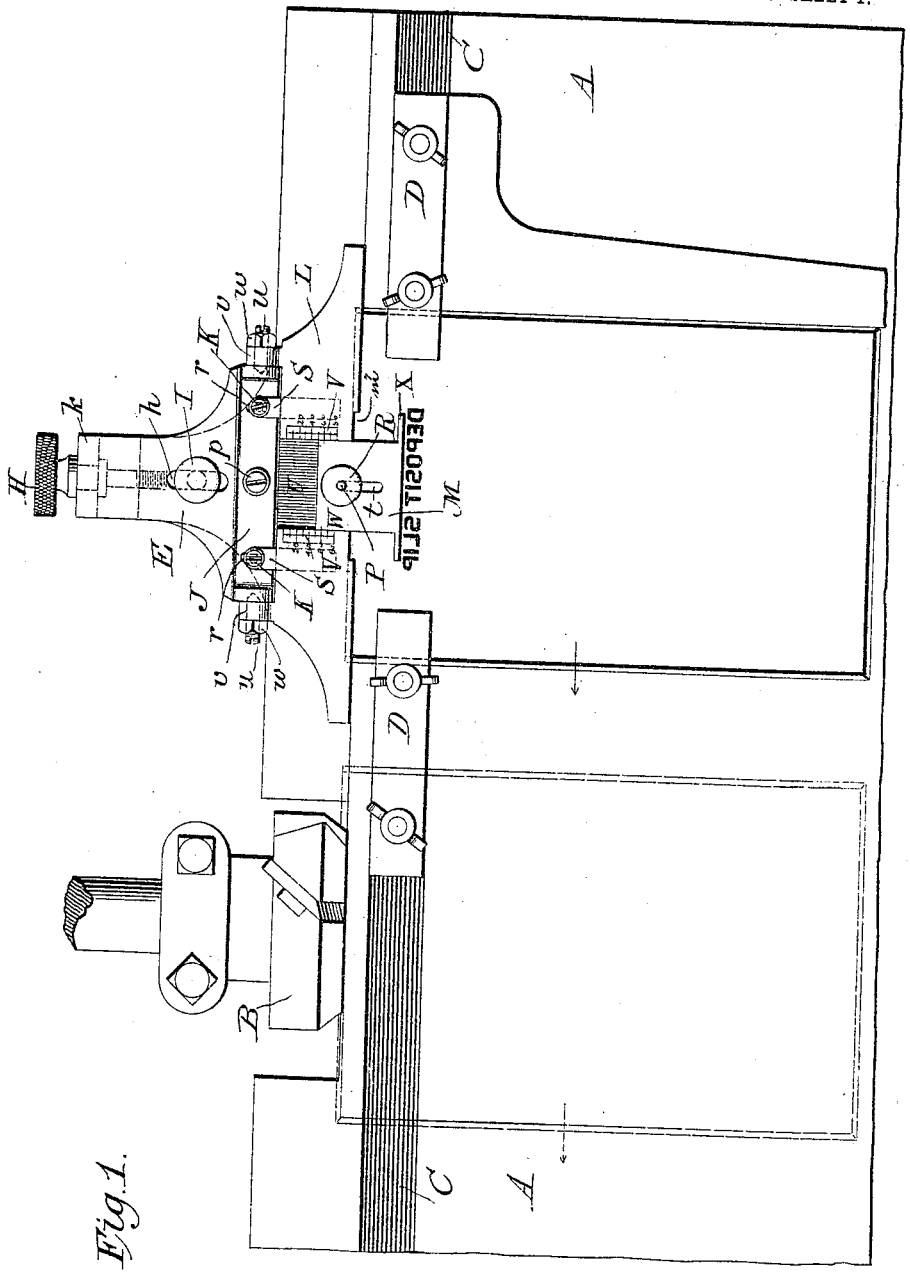
Figure 1:
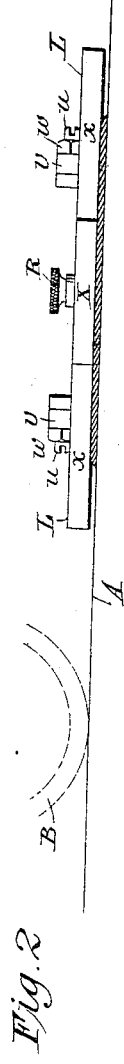
Figure 3:
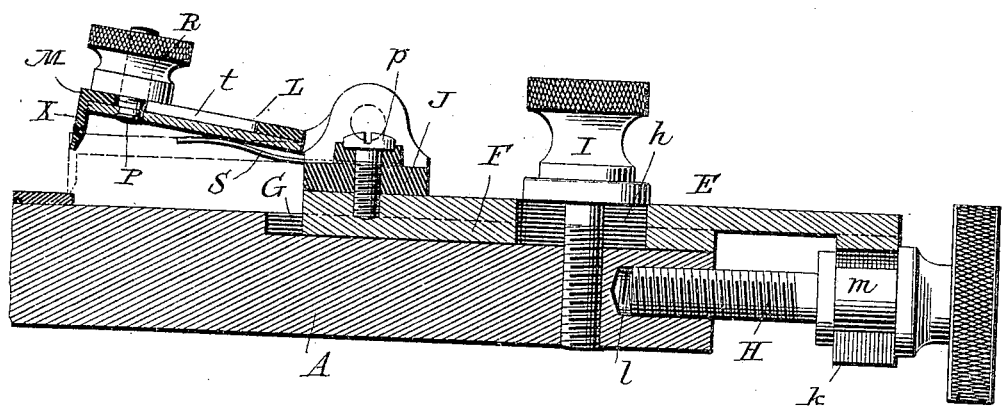
Figure 4:
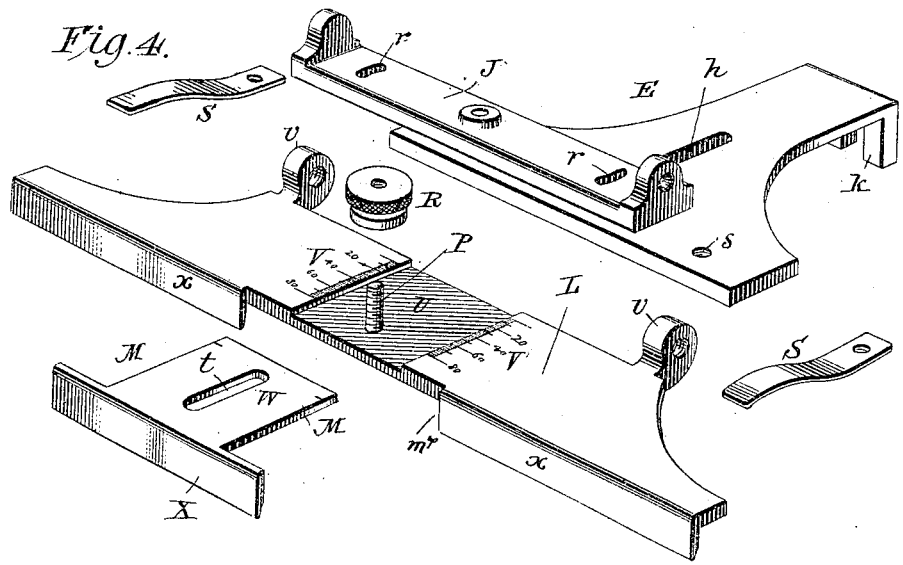

Figure 1 is a view illustrating the gage constituting the present and preferred embodiment of my invention as properly applied to an electrotype beveling and head machine and also illustrating an electrotype as secured in proper position relative to the gage. Fig. 2 is a detail view illustrating the electrotype in transverse section and the gage in elevation. Fig. 3 is an enlarged section taken through the longitudinal center of the gage and showing some of the parts in elevation, and Fig. 4 comprises disconnected perspective views of certain parts comprised in the gage.

Similar letters designate corresponding parts in all of the views of the drawings, referring to which—

A is the table or work-support of a plate trimming or cutting machine designed for flat work. The said support because of the machine being designed for flat work is flat; but in this connection I desire it distinctly understood that the work-support may be of any shape in cross-section according to the work for which it is designed without in any way affecting my novel gage or the application thereof.

B is the rotary cutter of the machine, which *per se* may be of any construction compatible with the purposes of my invention.

C is a way formed in the work-support A and disposed parallel to the cutter, and D D are clamps movable in the way C and designed to hold an electrotype or other plate after the manner shown in Fig. 1 and carry the said plate, subsequent to the positioning thereof, to the cutter.

My novel gage, as before stated, has to do with the positioning of the electrotype or other plate relative to the cutter B, and in the present and preferred embodiment of my invention it comprises a body E, having a rib F on its under side disposed in a groove G in the frame of the machine and also having a longitudinal central slot $h$ and a depending bifurcated lug $k$; a screw H, bearing in a threaded socket $l$ in the machine-frame and having a circumferentially-grooved portion $m$ disposed in the said bifurcated lug $k$ of the body and designed to adjust the body E and the gage as a whole forwardly and backwardly; a screw I, bearing in a threaded aperture in the machine-frame, extending through the slot $h$ of body E and having a head bearing on said body, whereby it is adapted to adjustably fix the body with respect to the frame; a bar J, superposed on the forward portion of body E and pivotally connected to said body through the medium of a central bolt $p$, and having upwardly-extending lugs at its ends provided in their outer sides with sockets, and also having curvilinear slots $r$ at points adjacent to said ends, bolts K extending through the said curvilinear slots of the bar J and into screw-tapped apertures $s$ in the body E and having for their purpose to adjustably fix the bar with respect to the body; a vertically-swinging leaf L, pivoted to the lugs of the bar J; an extension M, carried by said leaf; a threaded bolt or post P, fixed to and rising from the leaf L and disposed in a slot $t$ of the extension M; a nut R, mounted on said post P and designed to adjustably fix the extension M with respect to the leaf L, and springs S, connected to the bar J, preferably through the medium of the bolts K, as shown in Fig. 1, and extending forwardly from said bar and disposed below the leaf L, so as to normally hold the latter in a slightly-raised position, Fig. 3, for a purpose presently set forth. The bar J by reason of the manner in which it is connected to the body E is adapted when the bolts K are loosened to be swung slightly on the bolt $p$, and in this way adjusted to preserve the trueness of the edge of the leaf L, which edge for accurate work is to be maintained in line with the cutter B. The vertically-swinging leaf L may be pivotally connected with the lugs of the bar J in any manner compatible with the purposes of my invention. I prefer, however, to effect the connection through the medium of screws $u$, bearing in threaded apertures in lugs $v$ of the leaf and having pointed inner ends journaled in the seats in the outer sides of the lugs on bar J and also having kerfs in their outer ends, and jam-nuts $w$, mounted on the screws at the outer sides of the lugs $v$. This manner of connecting the leaf L and the bar J is preferable, because it permits of the adjustment being readily tightened or loosened, as required. The active edge of the leaf L is preferably formed by a depending flange $x$, and in addition to the said flange $x$ and the lugs $v$ and the post P the leaf is provided with a way or groove U and graduated scales V at opposite sides of said groove. These graduated scales are appropriate to what is known in the printing and electrotyping art as the "point" system. The extension M is provided, in addition to the slot $t$, with a body portion W, disposed in the way or groove U of the leaf L, and, by preference, has its useful edge formed by a depending flange X. The springs S serve to normally hold the leaf L in a slightly-raised position, as before described, and hence it will be observed that an electrotype or analogous plate may be readily run under the edge $x$ of the leaf to the extent desired.

In the edge of the leaf L is provided a recess $m^7$, which is designed to seat the edge X of the extension M when the latter is not in use.

In the practical use of my novel gage when the end of an electrotype or analogous plate is to be cut strictly parallel with the lines of type thereof and the nearest line of type to said end is at a considerable distance therefrom the extension M is run out from the leaf L until its edge X is adjacent to the line of type, and the plate is adjusted to make said line of type parallel to the edge X, when, by reason of the edge X being perfectly parallel with the edge $x$ of leaf L, the cut that will be made at the end of the plate will be strictly parallel to the lines of type thereof, as is desirable. Subsequent to the described positioning of the electrotype or other plate the plate is secured in the clamps D and is then moved in said clamps and independent of the gage into engagement with the cutter B after the manner illustrated by full and dotted lines in Fig. 1, when the cut or trim made by the cutter will be strictly parallel to the lines of type of the gage.

It will be gathered from the foregoing that the extension M, in combination with the graduated scales V of the leaf L, further serves to enable a workman to accurately determine the amount of metal to be taken off the end of the electrotype or other plate to be trimmed or cut.

Notwithstanding the material advantages which I have hereinbefore ascribed to my novel gage, it will be observed that the same is inexpensive and durable and at the same time compact and susceptible of quick and easy adjustment.

I have specifically described the construction and relative arrangement of the parts embraced in the present and preferred embodiment of my invention in order to impart a perfectly definite understanding of the said embodiment. I do not desire, however, to be understood as confining myself to the said specific construction and relative arrangement of parts, as such changes or modifications may be made in practice as fairly fall within the scope of my invention as claimed.

Having described my invention, what I claim, and desire to secure by Letters Patent, is—

1. In a metal-cutting machine, the combination of a frame, a cutter, work-holding means movable parallel to the cutter, and a gage having an edge in line with the cutter and also having an extension provided with an edge arranged parallel to the first-mentioned edge.

2. In a metal-cutting machine, the combination of a frame, a cutter, work-holding means movable parallel to the cutter, and a gage comprising a portion having an edge in line with the cutter, an extension adjustable with respect to said portion and having an edge arranged parallel to the first-mentioned edge, and means for adjustably fixing the extension with respect to the said portion.

3. In a metal-cutting machine, the combination of a frame, a cutter, work-holding means movable parallel to the cutter, and a gage comprising a portion having an edge in line with the cutter, and also having a scale, an extension adjustable with respect to said portion and arranged to coöperate with said scale and having an edge arranged parallel to the first-mentioned edge, and means for adjustably fixing the extension with respect to the said portion.

4. In a metal-cutting machine, the combination of a frame, a cutter, work-holding means movable parallel to the cutter, and a gage comprising a portion having an edge in line with the cutter, and also having a way disposed at right angles to said edge, an extension adjustable in the way of the said portion and having an edge arranged parallel to the first-mentioned edge, and means for adjustably fixing the extension with respect to the said portion.

5. In a metal-cutting machine, the combination of a frame, a cutter, work-holding means movable parallel to the cutter, and a gage comprising a portion having an edge in line with the cutter, and also having a way at right angles to said edge and a scale at one side of the way, an extension adjustable in the way of the said portion and having an edge arranged parallel to the first-mentioned edge, and means for adjustably fixing the extension with respect to the said portion.

6. In a metal-cutting machine, the combination of a frame, a cutter, a gage located at one side of the cutter and having a vertically-swinging, spring-supported leaf provided with an edge in line with the cutter, and work-holding means movable parallel to the cutter and said edge of the leaf.

7. In a metal-cutting machine, the combination of a frame, a cutter, work-holding means movable parallel to the cutter, and a gage comprising a vertically-swinging, spring-supported leaf provided with an edge in line with the cutter, an extension adjustable with respect to said leaf and having an edge arranged parallel to the edge thereof, and means for adjustably fixing the extension with respect to the leaf.

8. In a metal-cutting machine, the combination of a frame, a cutter, work-holding means movable parallel to the cutter, and a gage comprising a body connected to the frame, a horizontally-swinging bar adjustably fixed on the body, a vertically-swinging, spring-supported leaf carried by said bar and provided with an edge in line with the cutter, an extension adjustable with respect to said leaf and having an edge arranged parallel to the edge thereof, and means for adjustably fixing the extension with respect to the leaf.

9. In a metal-cutting machine, the combination of a frame, a cutter, and a gage having an edge in line with the cutter and another edge adjustable laterally with respect to the first-mentioned edge.

10. In a metal-cutting machine, the combination of a frame, a cutter, and a gage having a vertically-swinging, spring-supported portion provided with an edge in line with the cutter, and also provided with another edge adjustable laterally with respect to the first-mentioned edge.

11. As an article of manufacture, a gage comprising a body, a horizontally-swinging bar adjustably fixed on the body, a vertically-swinging, spring-supported leaf carried by said bar and provided with an edge, an extension adjustable with respect to said leaf and having an edge arranged parallel to and movable laterally toward and from that of the leaf, and means for adjustably fixing the extension with respect to the leaf.

12. In a metal-cutting machine, the combination of a frame, a cutter, and a gage located at one side of the cutter and having a vertically-swinging, spring-supported leaf provided with an edge in line with the cutter.

13. In a metal-cutting machine, the combination of a frame, a cutter, and a gage having an edge in line with the cutter, a recess in said edge, and another edge adjustable laterally with respect to the first-mentioned edge and arranged to seat in the recess thereof.

14. In a metal-cutting machine, the combination of a frame, a cutter, and a gage having a vertically-swinging, spring-supported leaf provided with an edge in line with the cutter and a recess in said edge, and also having an extension provided with an edge movable laterally toward and from the first-mentioned edge and arranged to seat in the recess thereof.

In testimony whereof I have hereunto set my hand in presence of two subscribing witnesses.

FERDINAND WESEL.

Witnesses:
  EMIL STEPHANY,
  J. LEWIS NATTER.